US010310811B2

(12) United States Patent
Shergill et al.

(10) Patent No.: US 10,310,811 B2
(45) Date of Patent: Jun. 4, 2019

(54) TRANSITIONING A BUFFER TO BE ACCESSED EXCLUSIVELY BY A DRIVER LAYER FOR WRITING IMMEDIATE DATA STREAM

(71) Applicant: Hewlett Packard Enterprise Development LP, Houston, TX (US)

(72) Inventors: Gurinder Shergill, Fremont, CA (US); Roopesh Kumar Tamma, Fremont, CA (US); Thomas H. Marlette, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 237 days.

(21) Appl. No.: 15/476,697

(22) Filed: Mar. 31, 2017

(65) Prior Publication Data
US 2018/0285074 A1 Oct. 4, 2018

(51) Int. Cl.
*G06F 3/06* (2006.01)
*G06F 13/28* (2006.01)
*G06F 5/14* (2006.01)
*G06F 13/16* (2006.01)
*G06F 5/06* (2006.01)

(52) U.S. Cl.
CPC ............. *G06F 5/14* (2013.01); *G06F 3/061* (2013.01); *G06F 3/067* (2013.01); *G06F 3/0659* (2013.01); *G06F 5/06* (2013.01); *G06F 13/1673* (2013.01); *G06F 13/28* (2013.01); *G06F 2205/123* (2013.01); *G06F 2205/126* (2013.01)

(58) Field of Classification Search
None
See application file for complete search history.

(56) References Cited

U.S. PATENT DOCUMENTS

| 5,442,571 A | 8/1995 | Sites |
| 6,016,513 A | 1/2000 | Lowe |
| 6,085,217 A | 7/2000 | Ault et al. |
| 6,219,727 B1 | 4/2001 | Kailash et al. |

(Continued)

OTHER PUBLICATIONS

Deinoscloud, "vSphere 4.1 iSCSI Advanced Settings and Their Meanings," (Web Page), Aug. 19, 2010, 4 pages, available at: <deinoscloud.wordpress.com/2010/08/19/vsphere-4-1-iscsi-advanced-settings-and-their-meanings/>.

(Continued)

*Primary Examiner* — Scott C Sun
(74) *Attorney, Agent, or Firm* — Hewlett Packard Enterprise Patent Department

(57) ABSTRACT

Example method includes: negotiating, with a client device, a number of simultaneous I/O commands allowed in a single session between a storage device and the client device; pre-allocating a number of immediate data buffers for the single session based on the negotiated number of simultaneous I/O commands; receiving a write I/O command with immediate data, wherein the immediate data is transmitted within a single PDU as the I/O command; transitioning the pre-allocated buffers from a network interface state to a driver state in an atomic operation, the driver state enabling the pre-allocated buffers to be accessed by a driver layer of the storage device exclusively, and the atomic operation preventing other I/O commands from transitioning the network interface state of the pre-allocated buffers until the atomic operation is completed; and writing the immediate data to the pre-allocated buffers that are in the driver state.

20 Claims, 6 Drawing Sheets

(56) References Cited

U.S. PATENT DOCUMENTS

| | | |
|---|---|---|
| 6,526,446 B1 | 2/2003 | Yang et al. |
| 6,567,859 B1 | 5/2003 | Yang et al. |
| 6,591,310 B1 | 7/2003 | Johnson |
| 6,981,074 B2 | 12/2005 | Oner et al. |
| 7,200,695 B2 | 4/2007 | Rosner |
| 7,353,360 B1 | 4/2008 | Muller et al. |
| 7,440,469 B2 | 10/2008 | Oner |
| 8,006,016 B2 | 8/2011 | Muller et al. |
| 8,176,233 B1 | 5/2012 | Karamcheti |
| 8,194,670 B2 | 6/2012 | Tripathi et al. |
| 8,631,086 B2 | 1/2014 | Blocksome et al. |
| 8,724,657 B2 | 5/2014 | Kuila et al. |
| 8,874,803 B2 | 10/2014 | Thakkar |
| 8,881,141 B2 | 11/2014 | Koch et al. |
| 9,019,978 B2 | 4/2015 | Galles et al. |
| 9,055,104 B2 | 6/2015 | Philbrick et al. |
| 9,075,557 B2 | 7/2015 | Flynn et al. |
| 9,086,973 B2 | 7/2015 | Vorbach |
| 2004/0062246 A1 | 4/2004 | Boucher et al. |
| 2005/0240924 A1 | 10/2005 | Jones et al. |
| 2011/0225278 A1 | 9/2011 | Monchiero et al. |
| 2014/0089347 A1 | 3/2014 | Thelen |
| 2015/0032835 A1 | 1/2015 | Sharp et al. |
| 2016/0378674 A1 | 12/2016 | Cheng et al. |

OTHER PUBLICATIONS

Experts Exchange, "iSCSi Immediate Data Option," (Web Page), Dec. 15, 2015, 8 pages, available at: <experts-exchange.com/questions/28899961/iSCSi-Immediate-Data-Option.html>.

Magoutis, K., "Exploiting Direct-access Networking in Network Attached Storage Systems," (Research Paper), May 2003, 154 pages, available at: <cse.uoi.gr/~magoutis/magoutis-thesis.pdf>.

Microsoft, "Microsoft iSCSI Software Target 3.3 Implementation Notes," (Web Page), Jan. 30, 2017, 10 pages, available at https://technet.microsoft.com/en-us/library/gg983494(v=ws.10).aspx.

Okun, M. et al., "Atomic Writes for Data Integrity and Consistency in Shared Storage Devices for Clusters," (Research Paper), 2004, 9 pages, available online at <sciencedirect.com>.

Sourav, R. et al., "Memory Information from a Transmit Descriptor to a Tracking Data Structure," Indian Patent App. No. 201641025768, filed Jul. 27, 2016.

Stefanie Cannon, "Hewlett Packard Enterprise Unveils Most Significant 3PAR Flash Storage innovations to Date," Feb. 13, 2017, pp. 1-6, Hewlett Packard Enterprise Development LP, Available at: <hpe.com/us/en/newsroom/news-archive/press-release/2017/02/1296749-hewlett-packard-enterprise-unveils-most-significant-3par-flash-storage-innovations-to-date.html>.

The TCP/IP Guide, "TCP Immediate Data Transfer: 'Push' Function," (Web Page), Sep. 20, 2005, 4 pages, available at http://www.tcpipguide.com/free/t_TCPImmediateDataTransferPushFunction.htm.

Tech Enthusiast, "Converting Device Driver to DMA API," Jan. 15, 2016, 3 pages, http://shraddhabarke.github.io/Converting-to-DMA.

Allan Cruse, "Our 'xmit1000.c' driver," 2007, pp. 1-23, Available at: <cs.usfca.edu/~cruse/cs635/lesson24.ppt>.

BCM-Specs, "802.11 / DMA," Apr. 3, 2010, <http://bcm-v4.sipsolutions.net/802.11/DMA>.

Check Point Software Technologies Ltd., "What is the Ring Descriptor Size and under what circumstances should it be increased on IPSO OS," Apr. 28, 2014, pp. 1-4, Available at: <supportcenter.checkpoint.com/supportcenter/portal?eventSubmit_doGoviewsolutiondetails=&alternateid=kb1355738>.

Dan Siemon, "Queueing in the Linux Network Stack," Sep. 23, 2013, pp. 1-17, Available at: <linuxjournal.com/content/queueing-linux-network-stack>.

Erich Nahum, "Device Layer and Device Drivers," COMS W6998, Spring 2010, pp. 1-20, Available at: <cs.columbia.edu/~nahum/w6998lectures/device-layer.ppt>.

Hewlett Packard Enterprise Development LP, "HP-UX Integrity Virtual Machines—Guest Losses AVIO Network Connectivity After Lan Monitor Failover," Jul. 5, 2016, pp. 1-2, Available at: <h20564.www2.hpe.com/hpsc/doc/public/display?docId=c02833848&lang=en-us&cc=us>.

Hewlett Packard Enterprise Development LP, "HP-UX vPars and Integrity VM v6.4 Administrator Guide," Mar. 2016, pp. 1-290, Edition: 2.0, Available at: <h20565.www2.hpe.com/hpsc/doc/public/display?sp4ts.oid=4146186&docLocale=en_US&docId=emr_na-c05054227>.

Hewlett-Packard Development Company, L.P., "HP integrity VM Accelerated Virtual I/O (AVIO) Overview," Technical Introduction, Oct. 2008, pp. 1-20, Available at: <h20565.www2.hpe.com/hpsc/doc/public/display?sp4ts.oid=4146186&docLocale=en_US&docId=emr_na-c02018682>.

Hyeongyeop Kim, "Understanding TCP/IP Network Stack & Writing Network Apps," Mar. 2013, <http://www.cubrid.org/blog/dev-platform/understanding-tcp-ip-network-stack/>.

Jen-Cheng Huang et al., "Ally: OS-Transparent Packet Inspection Using Sequestered Cores," WIOV '10, Mar. 13, 2010, pp. 1-8, Available at: <sysrun.haifa.il.ibm.com/hrl/wiov2010/papers/huang.pdf>.

Net Silicon, "Ethernet Driver Changes," May 4, 2016, <ftp://ftp1.digi.com/support/training/5.1/Ethernet%20Driver%205.1.ppt>.

QNX Software Systems Limited, "Fine-Tuning Your Network Drivers," 2015, pp. 1-3, Available at: <qnx.com/developers/docs/6.4.1/neutrino/technotes/finetune_net.html>.

Tom Lyczko et al., "What is 'Number of Transmit Descriptors'??, " May 16, 2008, pp. 1-2, Available at: <community.hpe.com/t5/ProLiant-Servers-ML-DL-SL/What-is-Number-of-Transmit-Descriptors/td-p/4199467>.

Wikipedia, "Register Renaming," Apr. 16, 2016, pp. 1-8, Available at: <en.wikipedia.org/w/index.php?title=Register_renaming&oldid=715615540>.

Wikipedia, "Re-order buffer," Nov. 6, 2015, <https://en.wikipedia.org/w/index.php?title=Re-order_buffer&oldid=689330037>.

Wikipedia, "TCP Offload Engine," Apr. 30, 2016, pp. 1-5, Available at: <en.wikipedia.org/w/index.php?title=TCP_offload_engine&oldid=717970156>.

TRANSITIONING A BUFFER TO BE ACCESSED EXCLUSIVELY BY A DRIVER LAYER FOR WRITING IMMEDIATE DATA STREAM

BACKGROUND iSCSI, which stands for Internet Small Computer System Interface, generally refers to a transport layer protocol that works on top of the Transport Control Protocol (TCP) and allows the SCSI command to be sent end-to-end over local-area networks (LANs), wide-area networks (WANs), or the Internet. iSCSI can transport block-level data between an iSCSI initiator on a server and an iSCSI target on a storage device. The iSCSI protocol can encapsulate SCSI commands and assemble the data in packets for the TCP/IP layer. Packets are sent over the network using a point-to-point connection. Upon arrival, the iSCSI protocol disassembles the packets, separating the SCSI commands so the operating system (OS) can see the storage as a local SCSI device. Some SCSI commands utilize additional parameter data to accompany the SCSI command. Such client data is normally sent in a separate PDU, but can also be placed within the same protocol data unit (PDU) as the SCSI I/O command for improving performance, and is generally referred to as immediate data.

BRIEF DESCRIPTION OF THE DRAWINGS

The following detailed description references the drawings, wherein.

DETAILED DESCRIPTION

Examples described herein include a method for improving performance of multi-block write I/O in a lockless manner and physical address swapping for the buffer. The method provides support for large amounts of immediate data in the iSCSI protocol. During an iSCSI login session, the iSCSI initiator and the iSCSI target port can negotiate allowed immediate data with up to 16K bytes (or 32 blocks, each block 512 bytes) in size. The storage array then can pre-allocate and provide buffers to the target port to be used for Direct Memory Access (DMA) of any immediate data payload. On receiving a write I/O command with immediate data at the target port on the storage array, the iSCSI HBA can determine the pre-allocated buffers and the offset within the pre-allocated buffers to start direct memory accessing the I/O. The method also involves pulling and returning the pre-allocated buffers to the pool of pre-allocated immediate data buffers. The lockless aspect may be achieved by having a different buffer state for each code path (or layer of the storage device) that could access a given buffer at any time, thereby giving each code path (or layer) exclusivity. To aid in replenishing the buffers quickly, the target array can swap the physical buffer address to an address of an empty physical buffer while maintaining the same virtual address. Therefore, the virtual address and the immediate data buffer can be returned back to the port immediately, such that the target port will not experience any buffer exhaustion.

In examples described herein, a storage device, such as an iSCSI target storage array, can negotiate with a client device a number of simultaneous input/output (I/O) commands allowed in a single session between the storage device and the client device. In response to receiving a session connection to the storage device from the client device, the storage device can pre-allocate a number of immediate data buffers for the single session based on the negotiated number of simultaneous I/O commands. Then, the storage device may receive an I/O command together with immediate data. The immediate data generally refers to data transmitted within a single protocol data unit (PDU) as the I/O command. Next, the storage device can transition the pre-allocated buffers from a network interface state to a driver state in an atomic operation. The driver state enables the pre-allocated buffers to be accessed by a driver layer of the storage device exclusively. Also, the atomic operation prevents other I/O commands from transitioning the network interface state of the pre-allocated buffers until the atomic operation is completed. In addition, the storage device can write the immediate data to the pre-allocated buffers that are in the driver state.

Figure 1:
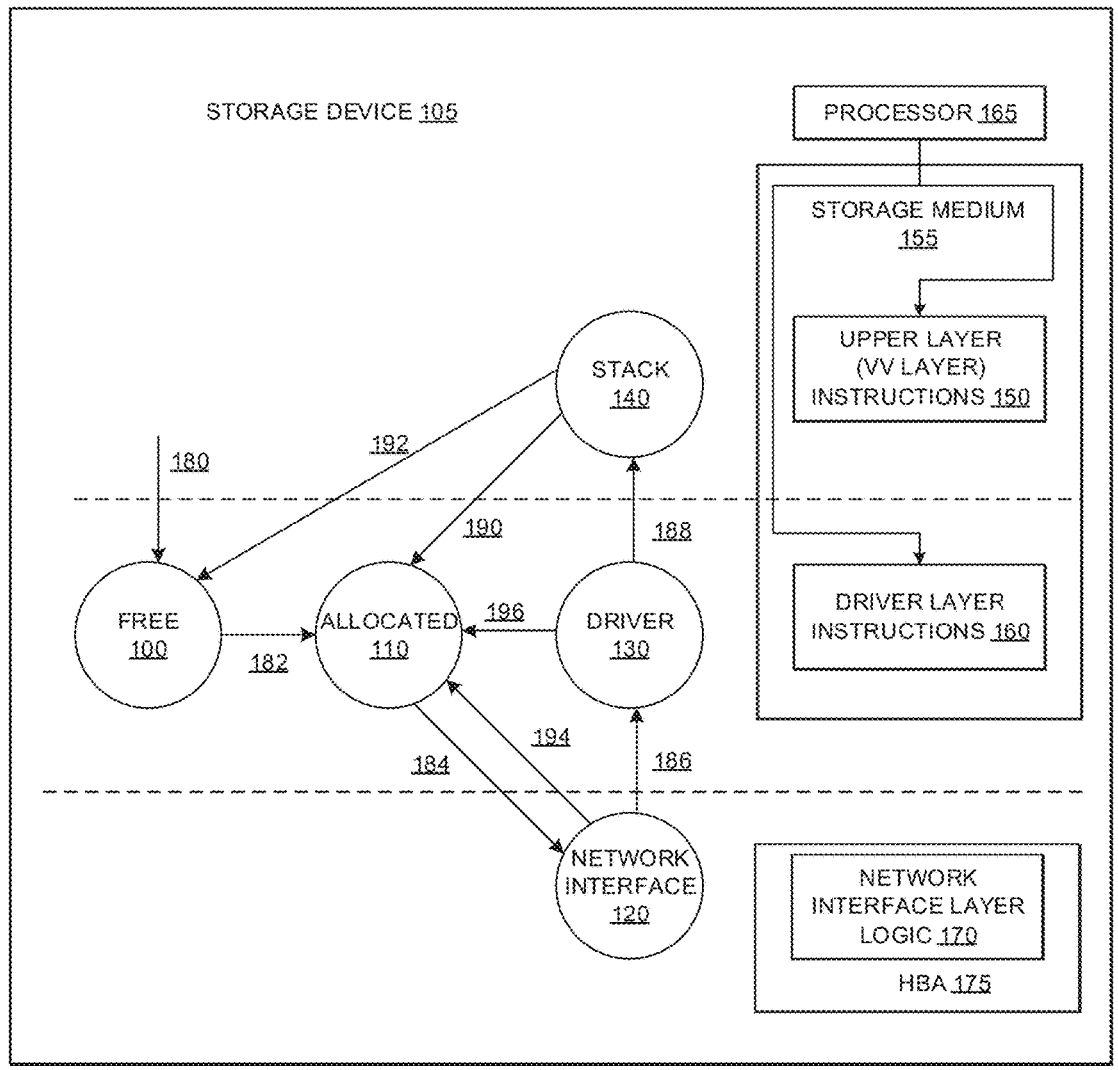
FIG. 1 is a block diagram of example state transitions for a buffer to be accessed exclusively by a respective layer (e.g., a network interface layer, driver layer, or upper layer) for writing immediate data input/output (I/O)

FIG. 1 is a block diagram of an example architecture and state transitions a buffer to be accessed exclusively by a driver layer of a storage device for writing immediate data input/output (I/O). The storage device 105 generally has three distinct layers, namely a network interface layer, which may be implemented by network interface layer logic 170 executable by a host bus adaptor (HBA) 175, as well as a driver layer and an upper layer. In the example of FIG. 1, the driver layer may be implemented by driver layer instructions 160 and the upper layer may be implemented by upper layer instructions 150. In such examples, instructions 150 and 160 may be stored in a computer-readable storage medium 155 and executable by a processor 165 of the storage device 105. In some examples, the network interface layer logic 170 may be implemented in hardware (e.g., circuitry), via instructions executable by circuitry of HBA 175, or a combination thereof. When an I/O command is first received at a port of the storage device 105, the I/O command is received by network interface layer logic 170, e.g., by a host bus adaptor (HBA) of the storage device 105. Although iSCSI is used as an example in this disclosure, the techniques can be extended to fiber channel and other layered storage systems as well. In this example, each HBA is controlled by a driver implemented by driver layer instructions 160. After the I/O data is received by the HBA, the HBA uses the data buffers to store the data, and passes the data buffers to the driver (e.g., driver layer instructions 160) for additional handling. The driver layer instructions 160 may include instructions to process I/O descriptor for each I/O passed to the driver by the HBA along with code to implement iSCSI. After driver layer instructions 160 complete processing the data buffers, the data buffers are further passed to upper layer instructions

150. Upper layer instructions 150 (also referred to as "virtual volume (VV) layer") may be a software-defined storage management and integration framework that enables array-based operations at the virtual disk level.

As the data buffers are passed between different layers of the storage device 105, a locking mechanism may be used to ensure that the data buffers are not accessed by multiple I/O commands at the same time. However, it is difficult to scale the locking mechanism to a large number of I/O commands. This is because a single lock generally is shared by multiple data buffers. When one I/O command utilizes the locking mechanism, other simultaneous I/O commands cannot use the lock in locking mechanism until the one I/O command completes the operation and releases the lock in the locking mechanism. As a result, at any given point of time, only one data buffer can be passed between two layers of the storage device 105. In some alternative implementations, the storage device 105 may maintain multiple queues that correspond to multiple locks. Thus, the multiple locks in the locking mechanism may improve the performance of the storage device 105. However, the operations of locking and releasing the lock still cause latency and contentions in the performance of storage device 105.

In the example shown in FIG. 1, the locking mechanism is eliminated. The state transitions illustrated in FIG. 1, and implemented by instructions 150, instructions 160 and logic 170, ensures that, for each data buffer that is passed between any two layers, there is a single layer in the storage device 105 that has exclusive access to change the state of the data buffer. Hence, the exclusivity offered by the state transitions implemented by storage device 105 eliminates the locking mechanism, thereby improving the performance of the storage device 105. For example, storage device 105 implements five unique states, namely, a free state 100, an allocated state 110, a network interface state 120, a driver state 130, and a stack state 140. When a particular buffer is in the network interface state 120, the buffer can be accessed exclusively by the network interface layer logic 170 of the storage device 105 (e.g., by the host bus adaptor 175). When the particular buffer is in the free state 100, the allocated state 110, or the driver state 130, the buffer can be accessed exclusively by the driver layer instructions 160 (e.g., the iSCSI driver). Likewise, when the particular buffer is in the stack state 140, the buffer can be accessed exclusively by the upper layer (VV layer) instructions 150.

During iSCSI driver initialization, the storage device 105 can allocate a plurality of data buffers and initialize (state transition 180) immediate data buffer metadata to its initial state, a free state 100. Later on, depending on configured parameters and number of active iSCSI initiator logins, iSCSI driver can select a buffer in the free state 100, allocates a clustered memory page (CMP) for the selected buffer, and transition (state transition 182) the selected buffer to an allocated state 110. The allocated state 110 enables the buffer to be selected and provided to the iSCSI HBA in the network interface layer logic 170.

Meanwhile, a replenish logic can periodically search for buffers in the allocated state 110, and provides those buffers to the iSCSI HBA in the network interface layer (HBA) logic 170 while also transitioning (state transition 184) the buffer state from allocated state 110 to a network interface state 120. Note that because buffers in the allocated state 110 is exclusively accessed by the driver in the driver layer instructions 160, the same buffer will not be accessed by two different entities from multiple layers at the same time.

In some examples, when a new session connection is started between the iSCSI initiator and the iSCSI target, the iSCSI driver can negotiate with the iSCSI initiator the maximum number of simultaneous I/O commands that the iSCSI driver can receive. Based on the negotiated maximum number of simultaneous I/O commands, the iSCSI driver can determine how many buffers it will transition from the allocated state 110 to the network interface (HBA) state 120.

In some examples, the replenish logic in the iSCSI driver can maintain a counter that counts the number of state transitions that have occurred from the network interface (HBA) state 120 to the driver state 130. When the counter reaches a predetermined threshold number, the replenish logic is triggered to replenish the predetermined threshold number of buffers from the allocated state 110 to the network interface (HBA) state 120.

Also, when a buffer in the allocated state 110 is selected for the HBA 175, the transition of the buffer state from the allocated state 110 to the network interface state 120 is completed in an atomic operation. The atomic operation prevents other I/O commands from changing the state of the selected buffer. If the buffer state fails to be exclusively transitioned from the allocated state 110 to the network interface state 120, the buffer state will roll back to the allocated state 110. Moreover, once the buffer state has been successfully transitioned from the allocated state 110 to the network interface state 120, the buffer state cannot be changed by the driver again because it is then exclusively accessed by the network interface layer logic 170.

The iSCSI HBA 175 makes use of the provided buffers as it receives the write I/O command with immediate data payload during the session between the iSCSI initiator and the iSCSI target (e.g., storage device 105). Specifically, the iSCSI HBA 175 can write the immediate data payload to the pre-allocated buffers via direct memory access (DMA), and then pass the buffers back to the iSCSI driver in driver layer instructions 160. When the driver receives the buffers, the driver can change (state transition 186) the buffer state from network interface state 120 to driver state 130.

Note that whenever iSCSI HBA 175 in network interface (HBA) layer logic 170 passes a buffer to the driver in driver layer instructions 160, the network interface (HBA) layer logic 170 has one fewer buffer. At this point, the driver can compare the number of buffers associated with the iSCSI HBA 175 against predetermined threshold values. The predetermined threshold values may vary based on the number of active iSCSI connection sessions. If number of buffers associated with the iSCSI HBA 175 is less than the predetermined threshold value, then the driver can replenish (state transition 184) the HBA buffers from the buffers in allocated state 110.

Moreover, the driver in driver layer instructions 160 can process the received I/O commands with immediate data, and pass the I/O along with immediate data buffer to an upper layer (VV layer) instructions 150. At that point, the driver also can transition (state transition 188) the buffer state from driver state 130 to a stack state 140.

The upper layer instructions 150 then can process the write I/O command and data. For example, the upper layer instructions 150 can make a copy of the data in the buffer to provide redundancy in the event of a corruption in the buffer. Because copying large immediate data takes a long time, in order to provide immediate release of the buffer, the upper layer instructions 150 of the storage device 105 can swap the physical address of the immediate data buffer to a second and different physical address that is associated with a second buffer having free and the same capacity (e.g., 16K bytes) as the immediate data buffer. Then, the upper layer logic 170 can return the same clustered memory page (CMP)

with the second and different physical address back to the driver in driver layer instructions 160. Thereafter, the driver can switch (state transition 190) the state of buffer returned from the upper layer instructions 150 from stack state 140 to allocated state 110. As a result, the buffer is returned back to the available buffer pool, from which the replenish logic can select buffers to provide to the iSCSI HBA in network interface layer (HBA layer) logic 170.

As iSCSI initiators logout, the driver can release allocated buffers. However, the buffers are released when they are returned from upper layer (VV layer) instructions 150. This ensures that the state transitions can maintain the lockless aspect, and only one state in the state transitions can search for available buffers in the allocated state 110. As the buffers are returned by the upper layer (VV layer) instructions 150, the driver can perform a check against the predetermined threshold value, and determine whether to place the returned buffers back into the pool or release the returned buffers. If the driver determines to release the returned buffers, then the driver can release the CMP and transition (state transition 192) the buffer state from stack state 140 to free state 100.

If no buffer is available to store the immediate data, the HBA will discard the immediate data received together with the I/O command. Because the total number of buffers is limited, it is important to release the buffers from the stack in the upper layer instructions 150 before sending an acknowledgement by the iSCSI target to indicate that the I/O command has been completed. Releasing the buffers from the stack involves transitioning (state transition 190) the buffer state from the stack state 140 to the allocated state 110. Also, at the time when the iSCSI driver sends the I/O command acknowledgement to the iSCSI initiator, the iSCSI driver can allocate a new buffer to HBA, e.g., by transitioning (state transition 184) the state of buffers that are just released from the upper layer instructions 150 from the allocated state 110 to the network interface state 120. This will ensure that there are buffers available to the HBA when a new I/O command and immediate data are received by the HBA. As long as the buffers are pre-allocated based on the negotiated maximum number of I/O commands in a single session, the buffer exhaustion will not occur to HBA during the single session.

Sometimes, HBA in the network interface layer logic 170 can encounter errors while receiving the write I/O command with immediate data. For example, due to packet loss, it is possible that only a part of the immediate data payload is received. In such cases, the iSCSI HBA can still pass the write I/O command with partial immediate data payload to the driver, but the iSCSI HBA can pass them with an error status. As a result, the iSCSI driver can log an error and transition (state transition 194) the buffer state from the network interface state 120 to the allocated state 110. Thus, the driver in effect puts the buffer back in the immediate data buffer pool.

Sometimes, as the iSCSI driver is processing the I/O command, the driver can detect errors with the write I/O command. For example, the error could be an invalid field in the iSCSI command header. In such cases, the iSCSI driver can log an error and transition the buffer from the driver state 130 to the allocated state 110. Thus, like in the previous scenario, the driver in effect puts the buffer back in the immediate data buffer pool.

In some examples, the storage device 105 can include a large number of buffers and each buffer can go through the different states illustrated in FIG. 1 individually. A client device associated with the storage device 105 can often observe a degraded performance when continuing sending the I/O commands with immediate data after a threshold number of I/O commands with immediate data have been sent to the storage device 105. This is because once the buffers are passed to the upper layer instructions 150 from the driver layer instructions 160, it may take a relatively long time for the upper layer instructions 150 to finish processing the data in the buffers. If the buffers cannot be released back to the allocated state 110 before the next I/O commands with immediate data is received, the HBA will have no buffer to store the incoming immediate data and will have to discard the data.

In some examples, a number of cluster memory pages in the size of 16K bytes reside on an ASIC. The ASIC (also known as "an application-specific integrated circuit") generally refers to an integrated circuit (IC) customized for a particular use, rather than intended for general-purpose use. An example buffer may include a handle, a CMP metadata structure virtual address, and a state of the buffer. The CMP virtual address can point to a CMP metadata structure, which has a pointer to a first CMP physical address in the ASIC memory (also known as Cluster Memory Page, which is 16K bytes in size). The first CMP physical address can then point to a page (e.g., in the size of 16K) in the cluster memory residing on the ASIC. Here, the page corresponding to the first CMP physical address is written with the immediate data as it is received and direct memory accessed by the iSCSI HBA. Note that there can be multiple CMP metadata structures with virtual addresses in the CPU memory, each pointing to a unique page in the cluster memory on the ASIC. Before the buffer is released to the driver from the upper layer, the VV layer can swap the first CMP physical address to a second CMP physical address in the CPU memory. The second CMP physical address may point to a different page in the cluster memory on the ASIC. The different page corresponding to the second CMP physical address may be free and having the same capacity (e.g., both 16K bytes) as the page corresponding to the first CMP physical address. Then, the VV layer can return the buffer back to the iSCSI driver and transition the buffer state to allocated state. The returned buffer can have the same CMP metadata structure virtual address, which is now pointing to the second CMP physical address in CPU memory. Moreover, the second CMP physical address points to a free page in the cluster memory on the ASIC.

Note that when a client device sends a maximum amount of immediate data in an I/O command, the immediate data can be successfully written in a single clustered memory page if the data starts at the beginning of the page. In some examples, the immediate data received with the I/O command may not start from the beginning of a page in the ASIC memory. In such cases, the storage device 105 (e.g., the HBA 175) can calculate an offset within a CMP at which the immediate data should be direct memory accessed. Then, the storage device 105 can tie two buffers that are in the same state together and associate both buffers with the same I/O command. Specifically, the HBA 175 can include in the input/output control block (IOCB) information, such as, the sender of the IO, the size of the IO, the offset at which the I/O data starts in a memory page, up to two handles to immediate data buffers, etc. If the HBA 175 determines that the I/O immediate data is not 16K aligned with the memory page, the HBA 175 will include two handles to two different data buffers, and the two handles correspond to two different CMP metadata structure virtual addresses, which are backed by two different CMP physical addresses. Both data buffers can be used for writing immediate data via DMA. For example, a first portion of the immediate data may be written to the first buffer starting at an offset address within the first CMP, whereas a second portion of the immediate data may be written to the second buffer starting from the beginning of the second CMP.

In some examples, for each block in the CMP, the storage device 105 can calculate a data integrity value (e.g., a cyclic redundancy check (CRC) code). In the context of immediate data, adding the data integrity value after each block in the CMP involves inspecting the I/O command to determine at which offset address to start writing the immediate data and further inspecting the I/O immediate data to determine where each block starts. Next, the iSCSI HBA 175 can DMA a block of data into the CMP, calculate the data integrity value and insert the value into the CMP. The iSCSI HBA 175 can repeat this process for each block in the immediate data.

Figure 2A:
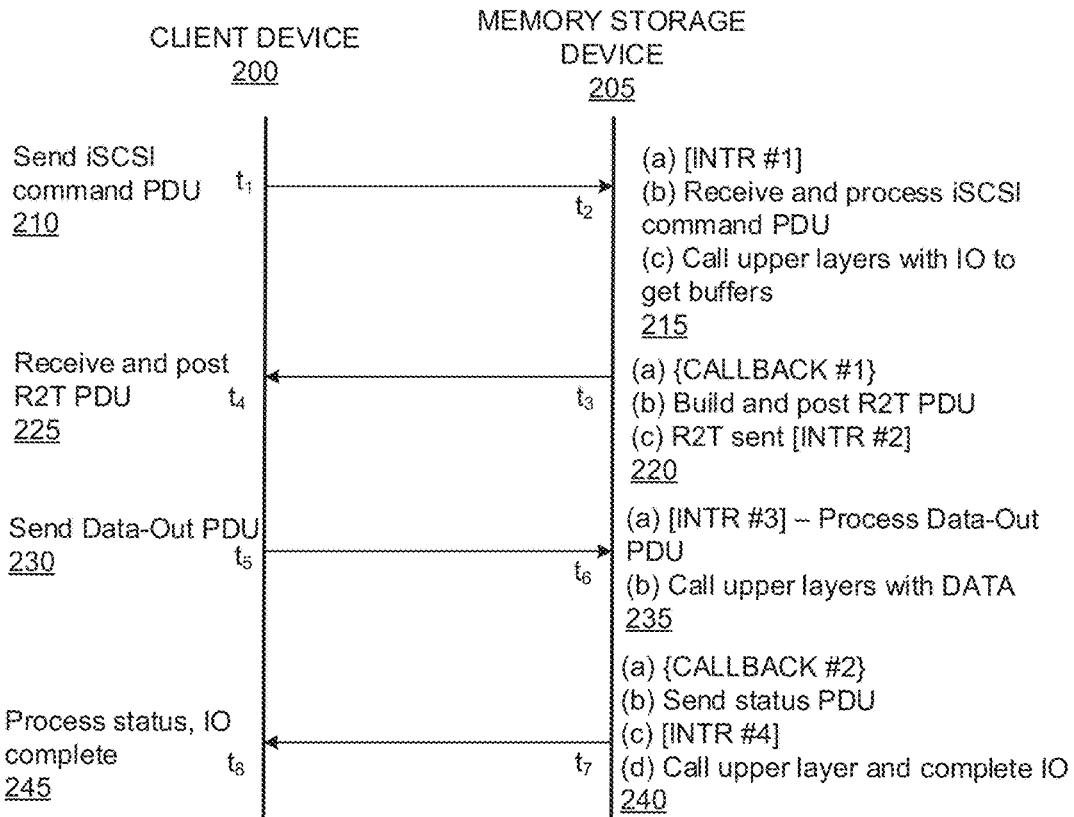
FIGS. 2A-2B are sequence diagrams of an example process of iSCSI transmissions between a client device and a storage device with and without immediate data input/output (I/O) support.
Figure 2B:
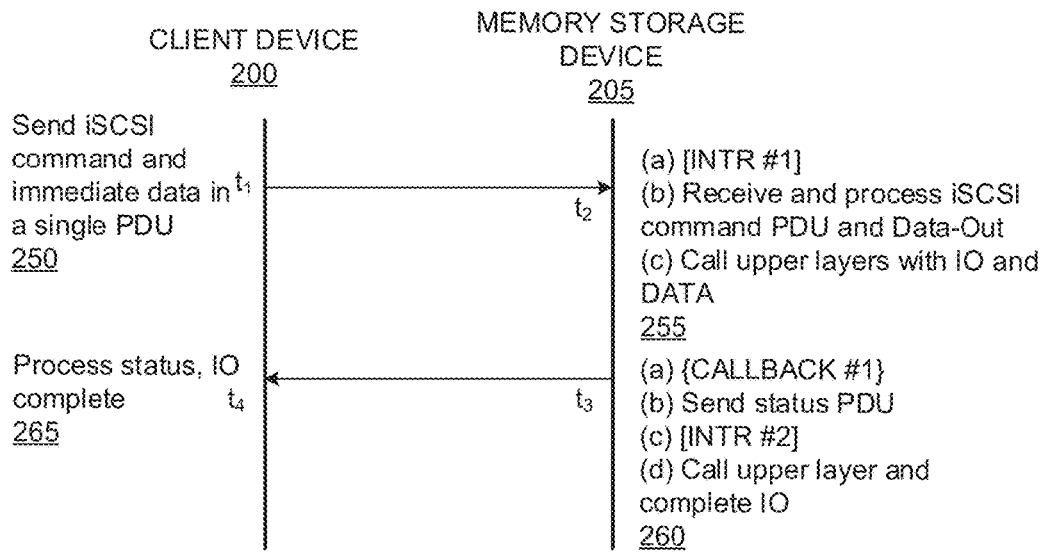

FIGS. 2A-2B are sequence diagrams of an example process of iSCSI transmissions between a client device 200 and a storage device 205 with and without immediate data inputs/outputs (IOs) support. The iSCSI immediate data technique enables an iSCSI initiator to send data in the same protocol data unit (PDU) as the one containing a write I/O command. This can improve performance for small size write I/O commands, because it eliminates the following steps: First, it eliminates the target from having to build, post, and transmit an iSCSI Ready-to-Transfer (R2T) PDU. Therefore, there is one less interrupt and DMA on the target side upon receiving a write I/O command. Second, it eliminates the initiator from having to receive and process an iSCSI R2T PDU. As a result, there is one less interrupt and DMA on the host side. Third, it eliminates the initiator from having to build and transmit a separate iSCSI Data-Out PDU, which is a part of the initial write I/O command. Finally, it eliminates the target from having to receive and process a separate iSCSI Data-Out PDU. Therefore, immediate data can cut the I/O response time, the number of interrupts handled by the target iSCSI driver, and the number of upper layer callbacks in half for small size (e.g., 16K bytes or less) write I/O commands.

As shown in FIG. 2A, the I/O flow without iSCSI immediate data involves four interrupts and two upper layer callbacks. Specifically, at time point $t_1$, client device 200 can send iSCSI command PDU 210 to storage device 205. Storage device 205 receives the iSCSI command PDU at time point $t_2$. It then performs operations 215, which involves (a) handling the first driver interrupt [INTR #1]; (b) receiving and processing iSCSI command PDU; and (c) calling the upper layer with I/O to get buffers. Next, at time point $t_3$, the target at the storage device 205 performs operations 220, which involves (a) receiving the first callback {CALLBACK #1} in response to the call to the upper layer to get buffers; (b) building and posting R2T PDU by the driver to provide the HBA with I/O context as well as the buffers; and (c) sending R2T PDU by the HBA to the iSCSI initiator to request the iSCSI initiator to send data, which is direct memory accessed directly into the buffers. iSCSI driver receives the second interrupt [INTR #2] when R2T has been successfully sent. At time point $t_4$, client device (iSCSI initiator) 200 receives and posts R2T PDU 225. Thereafter, at time point $t_5$, client device 200 sends a Data-Out PDU 230 in response to R2T PDU 225. At time point $t_6$, storage device 205 receives the Data-Out PDU and performs operations 235, which involves (a) writing the received data via DMA by the iSCSI HBA to the buffers provided, and sending the driver the third interrupt [INTR #3]; and (b) calling upper layers to inform that Data has been DMA'ed to the buffers. Subsequently, at time point $t_7$, storage device 205 further performs operations 240, which involves (a) receiving the second callback {CALLBACK #2}, (b) sending status PDU to the client device (iSCSI initiator) 200; (c) receives the fourth interrupt [INTR #4] when HBA has successfully sent the continued target I/O type 6 (CTIO-T6); and (d) calling upper layer and complete I/O command. Note that the driver also posts the status to the HBA using the CTIO-T6 input/output control block (IOCB).

As shown in FIG. 2B, the I/O flow with iSCSI large immediate data support for the same size I/O involves two interrupts and a single upper layer callback. Specifically, at time point $t_1$, client device 200 can send iSCSI command PDU 210 to storage device 205. Thereafter, at time point $t_2$, the storage device (iSCSI driver) 205 receives an [INTR #1] when the iSCSI HBA sends it ATIO-T3 IOCB, which refers to the write I/O command together with the immediate data buffers that already contain the DATA sent by the client device (iSCSI initiator) 200. The iSCSI driver can then call the upper layer with IO+DATA (operations 255). At time point $t_3$, the iSCSI driver gets back {Callback #1} with final STATUS. The storage device (iSCSI driver) 205 can then post the STATUS to the iSCSI HBA using CTIO-T6 IOCB. When the iSCSI HBA has successfully sent the CTIO-T6, the iSCSI driver receives final [INTR #2], at which point it calls the upper layers to complete the I/O command (operations 260).

Because the entire I/O command takes a single round trip time (RTT) with immediate data in this solution, as opposed to two RTTs without the large immediate data support, the host side I/O latency can be cut in half. Furthermore, the solution disclosed herein can support up to 16K bytes of immediate data, which is equivalent of 32 blocks of immediate data. This large allowance of immediate data would cover up to 90% of data commonly received in the iSCSI I/O commands. The immediate release of the buffers from the stack state 140 without waiting for the processing of immediate data by the upper layer instructions 150 to complete ensures that enough buffers would be in the allocated state 110 and ready to be used by the HBA when any new I/O commands with large amount of immediate data are received.

Figure 3:
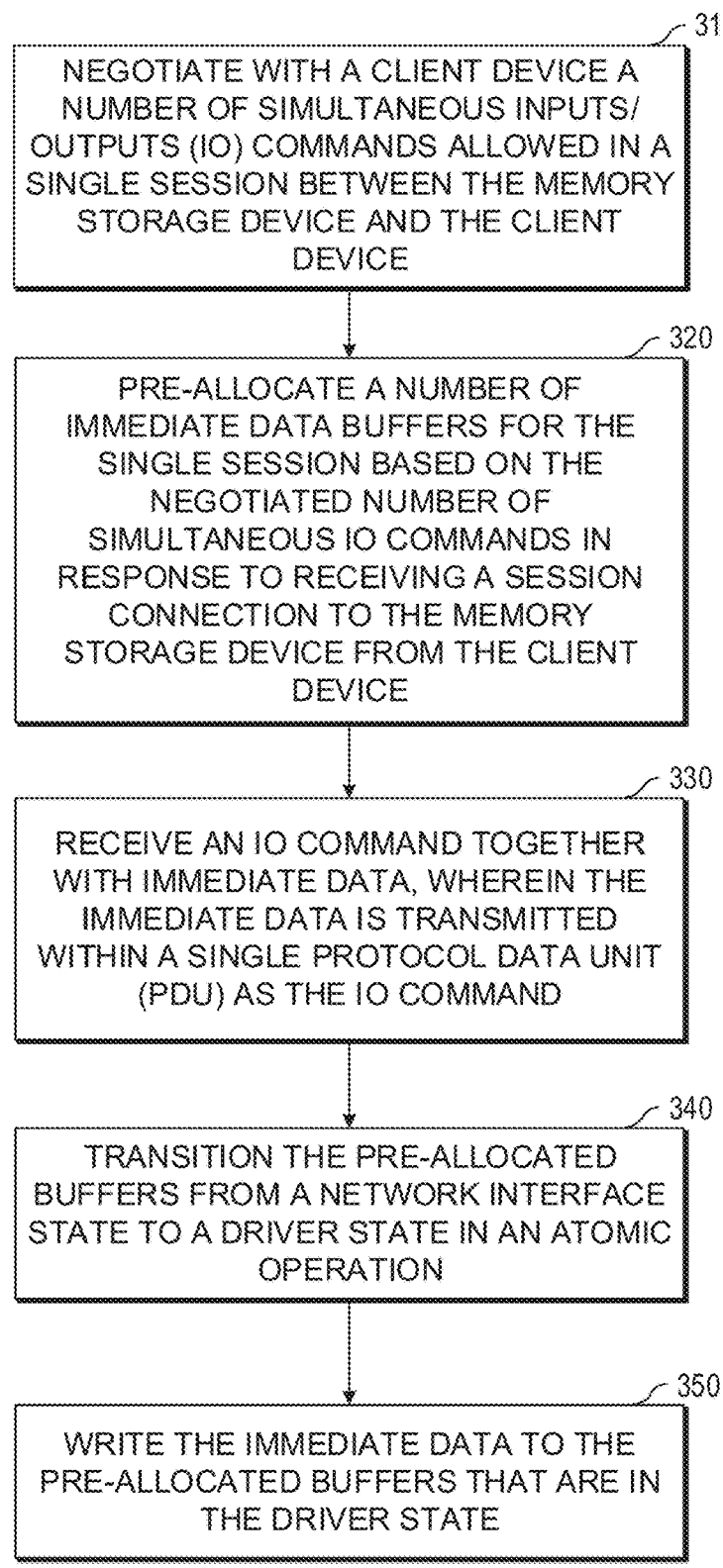
FIG. 3 is a flowchart of an example process of transitioning a buffer to be accessed exclusively by a driver layer for writing immediate data input/output (I/O)

In discussing FIGS. 3-4, references may be made to the components in FIGS. 1-2 to provide contextual examples. In one implementation, storage device 105 and 205 described in FIGS. 1-2 may execute operations 310-350 and 410-470 to transition a buffer to be accessed exclusively by a driver layer for writing immediate data inputs/outputs (I/Os). Further, although the method(s) of FIGS. 3-4 are described as implemented by a storage device, the method(s) may be executed on other suitable devices or components. For example, the method(s) of FIGS. 3-4 may be implemented in the form of executable instructions on a machine-readable storage medium 520 as in FIG. 5.

FIG. 3 is a flowchart of an example method (e.g., process) of transitioning a buffer to be accessed exclusively by a driver layer for writing immediate data IOs. During operations, a storage device (e.g., an iSCSI target) can negotiate with a client device a number of simultaneous I/O commands allowed in a single session between the storage device and the client device (operation 310). Then, the storage device can pre-allocate a number of immediate data buffers for the single session based on the negotiated number of simultaneous I/O commands, if the storage device receives a session connection to the storage device from the client device (operation 320). Furthermore, the storage device can receive an I/O command together with immediate data (operation 330). Note that the immediate data is transmitted within a single protocol data unit (PDU) as the I/O command. Then, the storage device can transition the pre-allocated buffers from a network interface state (e.g., a host bus adaptor (HBA) state) to a driver state in an atomic operation (operation 340). Here, the driver state enables the pre-allocated buffers to be accessed by a driver layer of the storage device exclusively. Also, the atomic operation prevents other I/O commands from transitioning the network interface state of the pre-allocated buffers until the atomic operation is completed. In addition, the storage device can write the immediate data to the pre-allocated buffers that are in the driver state.

Figure 4A:
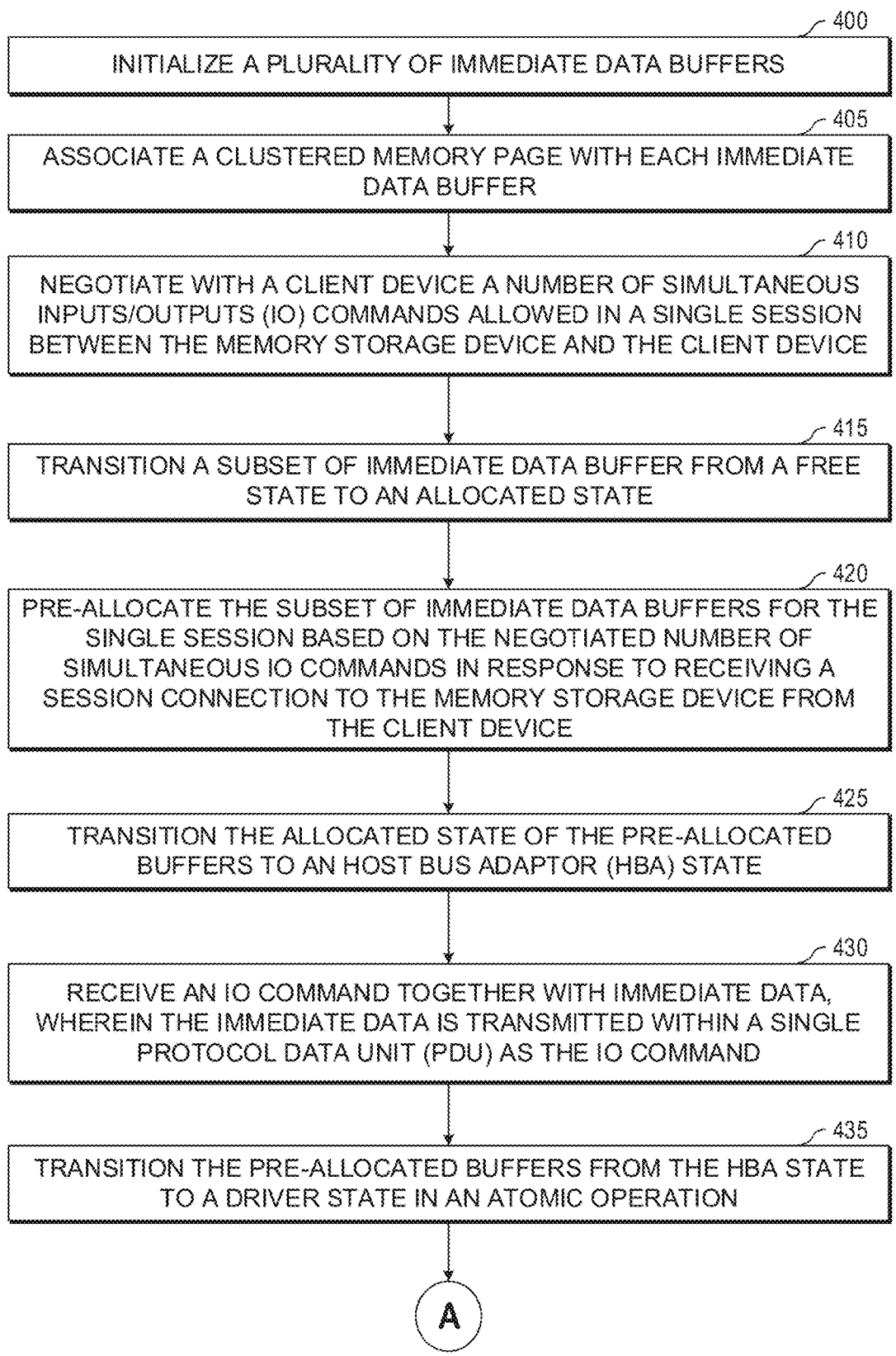
FIGS. 4A-4B are flowcharts of an example process of transitioning a buffer to be accessed exclusively by a respective layer (e.g., a network interface layer, driver layer, or upper layer) for writing immediate data input/output (I/O)
Figure 4B:
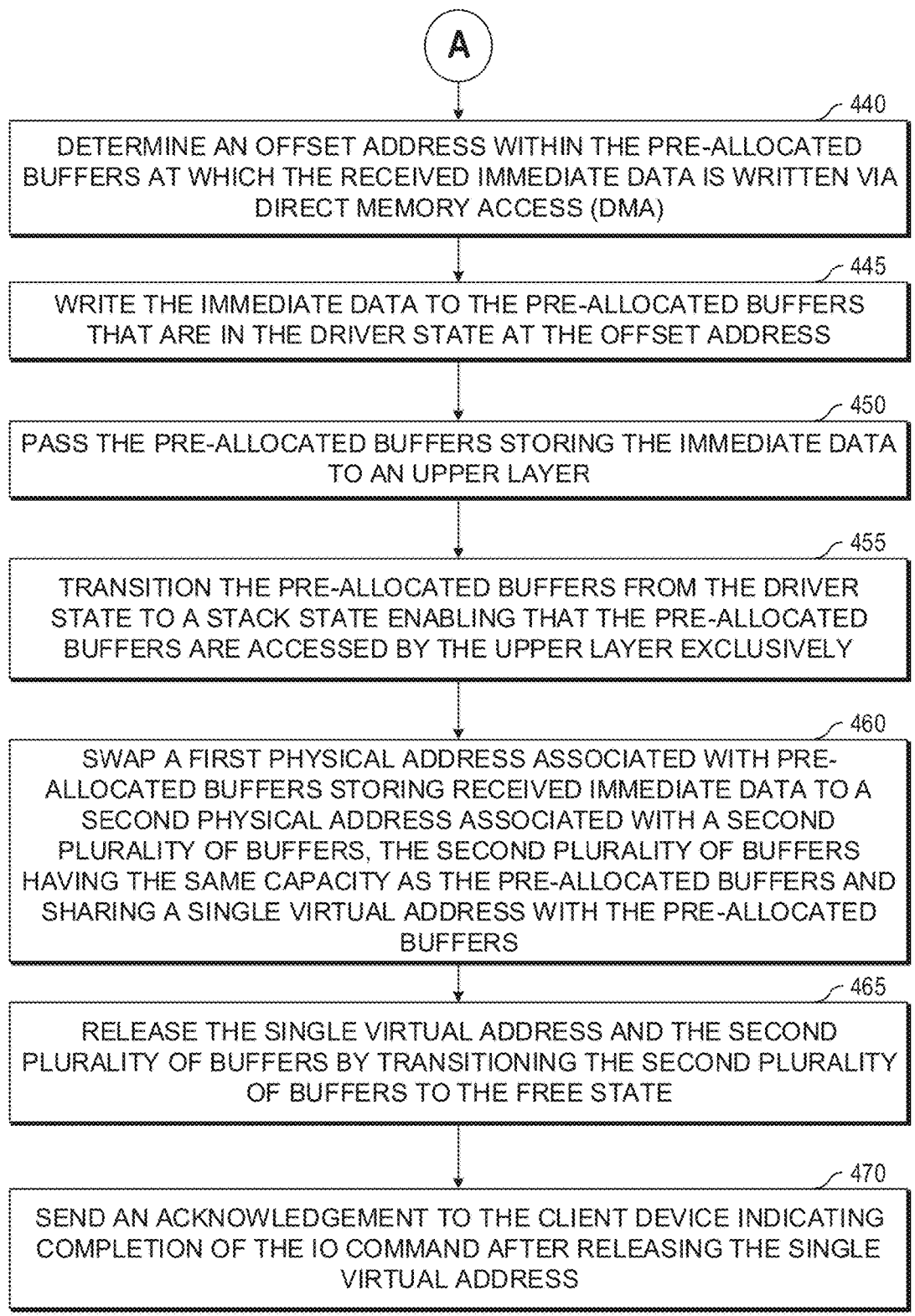

FIGS. 4A-4B are flowcharts of another example method (e.g., process) of transitioning a buffer to be accessed exclusively by a driver layer for writing immediate data IOs. During operations, a storage device can initialize a plurality of immediate data buffers (operation 400). An initial state of the plurality of immediate data buffers may be a free state, which enables that the immediate data buffers are free for allocation by the driver layer. Furthermore, the storage device can associate a clustered memory page (CMP) with each immediate data buffer (operation 405). Next, the storage device can negotiate, with a client device (e.g., an iSCSI initiator), a number of simultaneous inputs/outputs (IO) commands allowed in a single session between the storage device and the client device (operation 410). Then, the storage device can transition a subset of the immediate data buffers from the free state to an allocated state (operation 415). The allocated state enables that the subset of immediate data buffers are allocated and ready to be selected by the network interface (HBA) layer of the storage device. Next, the storage device can pre-allocate a number of immediate data buffers for the single session based on the negotiated number of simultaneous I/O commands, in response to receiving a session connection to the storage device from the client device (operation 420).

In response to pre-allocating a subset of immediate data buffers for the respective session, the storage device can transition the subset of immediate data buffers from an allocated state to a network interface state (operation 425). The network interface (HBA) state enables that the immediate data buffers are accessed by a network interface layer of the storage device exclusively. Subsequently, the storage device can receive an I/O command together with immediate data, wherein the immediate data is transmitted within a single protocol data unit (PDU) as the I/O command (operation 430). Then, the storage device can transition the pre-allocated buffers from a network interface state to a driver state in an atomic operation (operation 435). Here, the driver state enables the pre-allocated buffers to be accessed by a driver layer of the storage device exclusively. Also, the atomic operation prevents other I/O commands from transitioning the network interface state of the pre-allocated buffers until the atomic operation is completed.

In some examples, the storage device further can determine an offset address within the pre-allocated buffers at which the received immediate data is written via direct memory access (DMA) (operation 440). Then, the storage device can write the immediate data to the pre-allocated buffers in the driver state at the offset address (operation 445). Thereafter, the storage device can pass the pre-allocated buffers storing the immediate data to an upper layer (operation 450). Also, the storage device may transition the pre-allocated buffers from the driver state to a stack state (operation 455). The stack state enables that the pre-allocated buffers are accessed by the upper layer of the storage device exclusively.

In some examples, the storage device can swap a first physical address associated with the pre-allocated buffers storing received immediate data to a second physical address associated with a second plurality of buffers (operation 460). Note that the second plurality of buffers are free, have the same capacity as the pre-allocated buffers, and share the same virtual address with the pre-allocated buffers. Thereafter, the storage device can release the single virtual address and the second plurality of buffers by transitioning the second plurality of data buffers to the free state (operation 465). Further, the storage device can transmit an acknowledgement to the client device indicating that the I/O command is completed, subsequent to releasing the immediate data buffers (operation 470).

Figure 5:
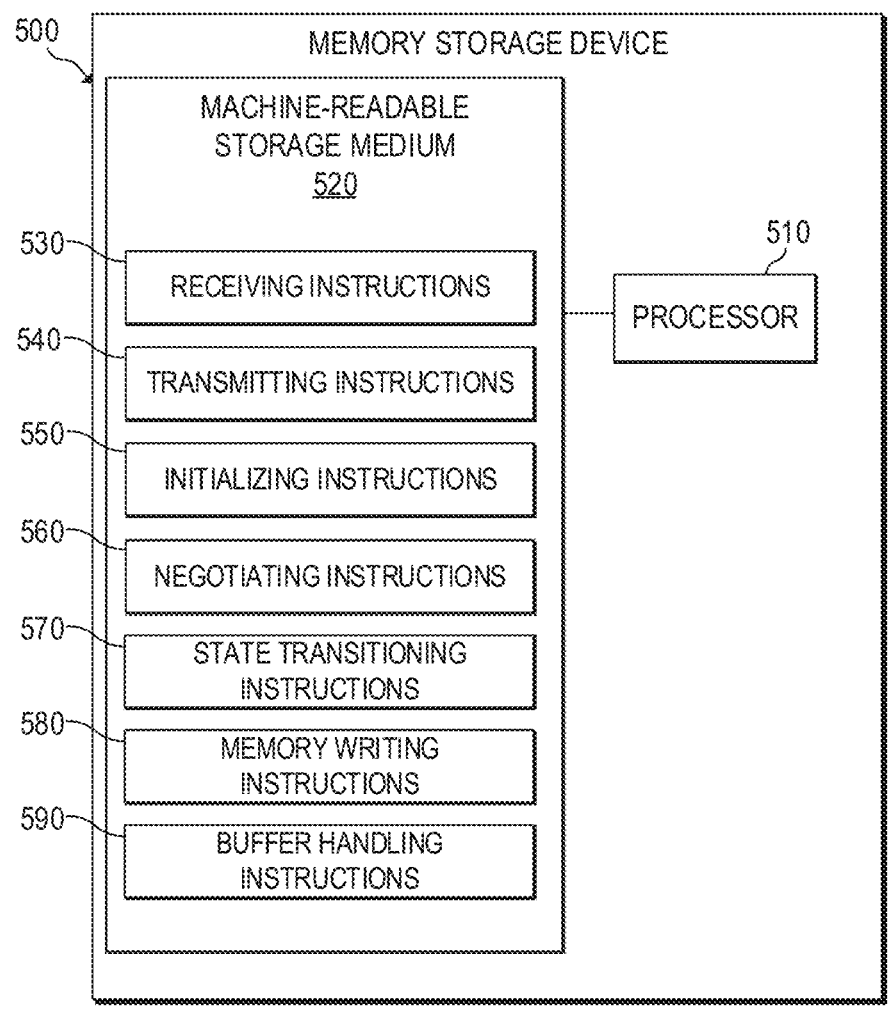
FIG. 5 is a block diagram of an example network device to transition a buffer to be accessed exclusively by a respective layer (e.g., a network interface layer, driver layer, or upper layer) for writing immediate data input/output (I/O).

FIG. 5 is a block diagram of an example storage device with at least one processor 510 to execute instructions 530-590 within a machine-readable storage medium 520 to transition a buffer to be accessed exclusively by a driver layer for writing immediate data IOs. Instructions 530-590 may include receiving instructions 530, transmitting instructions 540, initializing instructions 550, negotiating instructions 560, state transitioning instructions 570, memory writing instructions 580, and buffer handling instructions 590.

In some examples, the storage device can further compute a cyclic redundancy check (CRC) value, and write the CRC value after each block of the immediate data in the pre-allocated buffers.

In some examples, the storage device can recursively check an atomic primitive to determine whether the pre-allocated buffers in the allocated state are being searched exclusively. In response to the atomic primitive indicating that the pre-allocated buffers are being searched exclusively, the storage device can search for the pre-allocated buffers for storing the received immediate data. In response to the HBA maintaining multiple queues for the immediate data buffers, and in response to the atomic primitive indicating that the pre-allocated buffers are not being searched exclusively, the storage device can wait for a search for buffers associated with a different queue in the multiple queues maintained by the HBA to be completed.

As used herein, a "storage device" may be a computing device (such as a storage array) including at least one storage drive (e.g., solid state drive(s), hard disk drive(s), or any combination thereof) and a controller (e.g., computing circuitry). A storage device may write data into or read data from the storage drive(s) in response to requests from respective host system(s). In some examples, the controller may be implemented, at least in part, by a combination of hardware and programming. For example, the hardware may comprise at least one processor (e.g., processor 510) and the programming may comprise instructions, executable by the processor(s), stored on at least one machine-readable storage medium (e.g., 520). In addition, a storage device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 510 may fetch, decode, and execute instructions stored on storage medium 520 to perform the functionalities described below in relation to instructions 530-390. In other examples, the functionalities of any of the instructions of storage medium 520 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 5, storage medium 520 may be implemented by one machine-readable storage medium, or multiple machine-readable storage media.

Although the storage device 500 includes at least one processor 510 and machine-readable storage medium 520, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, receiving instructions 530 may be executed by processor 510 to receive an I/O command together with immediate data, wherein the immediate data is transmitted within a single protocol data unit (PDU) as the I/O command as described above in relation to FIG. 1.

Transmitting instructions 540 may be executed by processor 510 to transmit an acknowledgement to the client device indicating that the I/O command is completed subsequent to releasing the immediate data buffers as described above in relation to FIG. 1.

Initializing instructions 550 may be executed by processor 510 to initialize a plurality of immediate data buffers, wherein an initial state of the plurality of immediate data buffers comprises a free state enabling that the immediate data buffers are free for allocation by the driver layer; associate a clustered memory page (CMP) with each immediate data buffer as described above in relation to FIG. 1.

Negotiating instructions 560 may be executed by processor 510 to negotiate with a client device a number of simultaneous inputs/outputs (IO) commands allowed in a single session between the storage device and the client device as described above in relation to FIG. 1.

As described above in relation to FIG. 1, state transitioning instructions 570 may be executed by processor 510 to transition the pre-allocated buffers from a network interface state to a driver state in an atomic operation, wherein the driver state enables the pre-allocated buffers to be accessed by a driver layer of the storage device exclusively, and wherein the atomic operation prevents other I/O commands from transitioning the network interface state of the pre-allocated buffers until the atomic operation is completed. Transitioning instructions 570 may further transition a subset of the free immediate data buffers from the free state to an allocated state, the allocated state enabling that the subset of immediate data buffers are allocated; transition the subset of immediate data buffers from an allocated state to a network interface state, the network interface state enabling that the immediate data buffers are accessed by a network interface layer of the storage device exclusively, in response to pre-allocating a subset of immediate data buffers for the respective session; transition the pre-allocated buffers from the driver state to a stack state indicating that the pre-allocated buffers are accessed by the upper layer of the storage device exclusively; release a plurality of immediate data buffers by transitioning the immediate data buffers to the free state.

As described above in relation to FIG. 1, memory writing instructions 580 may be executed by processor 510 to determine a number of pre-allocated buffers in the HBA state for storing the received immediate data; determine an offset address within the pre-allocated buffers at which the received immediate data is written via direct memory access (DMA); write the immediate data to the pre-allocated buffers in the driver state at the offset address; compute a cyclic redundancy check (CRC) value; writing the CRC value after each block of the immediate data in the pre-allocated buffers.

As described above in relation to FIG. 1, buffer handling instructions 590 may be executed by processor 510 to pre-allocate a number of immediate data buffers for the single session based on the negotiated number of simultaneous I/O commands in response to receiving a session connection to the storage device from the client device; pass the pre-allocated buffers storing the immediate data to an upper layer; swap a first physical address associated with the pre-allocated buffers storing received immediate data to a second physical address associated with a second plurality of buffers, the second plurality of buffers being free, having the same capacity as the pre-allocated buffers, and sharing the same virtual address with the pre-allocated buffers; recursively check an atomic primitive to determine whether the pre-allocated buffers in the allocated state are being searched exclusively in response to the HBA maintaining multiple queues for the immediate data buffers; search for the pre-allocated buffers for storing the received immediate data in response to the atomic primitive indicating that the pre-allocated buffers are being searched exclusively; wait for a search for buffers associated with a different queue in the multiple queues maintained by the HBA to be completed, in response to the atomic primitive indicating that the pre-allocated buffers are not being searched exclusively.

All of the of the features disclosed in this specification (including any accompanying claims, abstract and drawings), and/or all of the elements of any method or process so disclosed, may be combined in any combination, except combinations where at least some of such features and/or elements are mutually exclusive.

We claim:

1. A method comprising:
   negotiating, by a storage device, with a client device a number of simultaneous input/output (I/O) commands allowed in a single session between the storage device and the client device;
   in response to receiving a session connection to the storage device from the client device, pre-allocating a number of immediate data buffers for the single session based on the negotiated number of simultaneous I/O commands;
   receiving, by the storage device, an I/O command together with immediate data, wherein the immediate data is transmitted within a single protocol data unit (PDU) as the I/O command;

transitioning, by the storage device, the pre-allocated buffers from a network interface state to a driver state in an atomic operation, wherein the driver state enables the pre-allocated buffers to be accessed by a driver layer of the storage device exclusively, and wherein the atomic operation prevents other I/O commands from transitioning the network interface state of the pre-allocated buffers until the atomic operation is completed; and writing, by the storage device, the immediate data to the pre-allocated buffers that are in the driver state.

2. The method of claim 1, further comprising:

initializing, at a storage device, a plurality of immediate data buffers, wherein an initial state of the plurality of immediate data buffers comprises a free state enabling that the immediate data buffers are free for allocation by the driver layer.

3. The method of claim 2, further comprising:

associating, by the storage device, a clustered memory page (CMP) with each immediate data buffer;

transitioning, by the storage device, a subset of the free immediate data buffers from the free state to an allocated state, the allocated state enabling that the subset of immediate data buffers are allocated.

4. The method of claim 1, further comprising:

in response to pre-allocating a subset of immediate data buffers for the respective session, transitioning, by the storage device, the subset of immediate data buffers from an allocated state to a network interface state, the network interface state enabling that the immediate data buffers are accessed by a network interface layer of the storage device exclusively.

5. The method of claim 1, further comprising:

determining, by the storage device, a number of pre-allocated buffers in the HBA state for storing the received immediate data;

determining, by the storage device, an offset address within the pre-allocated buffers at which the received immediate data is written via direct memory access (DMA); and writing, by the storage device, the immediate data to the pre-allocated buffers in the driver state at the offset address.

6. The method of claim 1, further comprising:

passing, by the storage device, the pre-allocated buffers storing the immediate data to an upper layer; and transitioning, by the storage device, the pre-allocated buffers from the driver state to a stack state indicating that the pre-allocated buffers are accessed by the upper layer of the storage device exclusively.

7. The method of claim 1, further comprising:

releasing, by the storage device, a plurality of immediate data buffers by transitioning the immediate data buffers to the free state; and subsequent to releasing the immediate data buffers, transmitting an acknowledgement to the client device indicating that the I/O command is completed.

8. The method of claim 7, further comprising:

swapping, by the storage device, a first physical address associated with the pre-allocated buffers storing received immediate data to a second physical address associated with a second plurality of buffers, the second plurality of buffers being free, having the same capacity as the pre-allocated buffers, and sharing the same virtual address with the pre-allocated buffers.

9. The method of claim 1, further comprising:

computing, by the storage device, a cyclic redundancy check (CRC) value; and writing the CRC value after the immediate data in the pre-allocated buffers.

10. A non-transitory machine-readable storage medium with instructions executable to at least partially implement an Internet Small Computer System Interface (iSCSI) driver, the instructions executable to:

negotiate with a client device a number of simultaneous input/output (IO) commands allowed in a single session between the storage device and the client device;

pre-allocate a subset of immediate data buffers for the single session based on the negotiated number of simultaneous I/O commands in response to receiving a session connection to the storage device from the client device;

receive an I/O input comprising an I/O command and immediate data, wherein the immediate data is transmitted within a single protocol data unit (PDU) as the I/O command;

transition the pre-allocated buffers to a driver state from a network interface state in an atomic operation, wherein the driver state enables that the pre-allocated buffers are accessed by a driver layer of the storage device exclusively, and wherein the atomic operation prevents other I/O commands from transitioning the network interface state of the pre-allocated buffers until the atomic operation is completed; and write the immediate data to the pre-allocated buffers in the driver state.

11. The non-transitory machine-readable storage medium of claim 10, wherein the memory processing logic further to:

initialize a plurality of immediate data buffers, wherein an initial state of the plurality of immediate data buffers comprises a free state enabling that the immediate data buffers are free for allocation;

associate a clustered memory page (CMP) with each immediate data buffer;

transition a subset of the immediate data buffers from the free state to an allocated state, the allocated state enabling that the subset of immediate data buffers are allocated.

12. The non-transitory machine-readable storage medium of claim 10, wherein the memory processing logic further to:

transition the subset of immediate data buffers from an allocated state to a HBA state in response to the network interface pre-allocating a subset of immediate data buffers for the respective session, the HBA state enabling that the immediate data buffers are accessed by a HBA layer of the storage device exclusively.

13. The non-transitory machine-readable storage medium of claim 10, wherein the memory processing logic further to:

pass the pre-allocated buffers storing the immediate data to the virtual volume layer via the second interface; and transition the pre-allocated buffers from the driver state to a stack state enabling that the pre-allocated buffers are accessed by the VV layer of the storage device exclusively.

14. The non-transitory machine-readable storage medium of claim 13, wherein the memory processing logic further to:

release the pre-allocated buffers by transitioning the immediate data buffers from the stack state to the free state; and send an acknowledgement to the client device indicating that the I/O command is completed subsequent to releasing the pre-allocated buffers.

15. The non-transitory machine-readable storage medium of claim 10, wherein in response to the HBA maintaining multiple queues for the immediate data buffers, the memory processing logic further to:
- recursively check an atomic primitive to determine whether the pre-allocated buffers in the allocated state are being searched exclusively;
- in response to the atomic primitive indicating that the pre-allocated buffers are being searched exclusively, search for the pre-allocated buffers for storing the received immediate data.

16. The non-transitory machine-readable storage medium of claim 10, wherein in response to the HBA maintaining multiple queues for the immediate data buffers, and in response to the atomic primitive indicating that the pre-allocated buffers are not being searched exclusively, the memory processing logic further to:
- wait for a search for buffers associated with a different queue in the multiple queues maintained by the HBA to be completed.

17. A computing device comprising:
- at least one processor;
- a non-transitory machine-readable storage medium comprising instructions executable by at least one processor to:
- negotiate with a client device a number of simultaneous inputs/outputs (IO) commands allowed in a single session between the memory storage array and a client device;
- search, in a first atomic operation, for a plurality of available immediate data buffers based on the negotiated number of I/O commands in response to receiving a session connection to the memory storage array from the client device;
- allocate, in the first atomic operation, the plurality of immediate data buffers for the single session;
- receive an I/O command and immediate data, wherein the immediate data is transmitted within a single protocol data unit (PDU) as the I/O command;
- switch, in a second atomic operation, a subset of the plurality of immediate data buffers to a driver state from a network interface state in an atomic operation, wherein the driver state enabling that the subset of immediate data buffers are accessed by a driver layer of the memory storage array exclusively, and wherein the atomic operation prevents other I/O commands from transitioning the network interface state of the pre-allocated buffers until the atomic operation is completed; and
- write the immediate data to the subset of immediate data buffers in the driver state.

18. The computing device of claim 17, the machine-readable storage medium further comprising instructions to:
- initialize the plurality of immediate data buffers, wherein an initial state of the plurality of immediate data buffers comprises a free state enabling that the immediate data buffers are free for allocation;
- transition the subset of the immediate data buffers from the free state to an allocated state in response to negotiating with the client device the number of simultaneous I/O commands allowed between the memory storage array and the client device, the allocated state enabling that the subset of immediate data buffers are allocated;
- transition the subset of immediate data buffers from the allocated state to a network interface state in response to a network interface associated with the memory storage array allocating the subset of immediate data buffers for the single session, the network interface state enabling that the immediate data buffers are accessed by a network interface layer of the storage device exclusively;
- transition the subset of immediate data buffers from the driver state to a stack state, the stack state enabling that the subset of immediate data buffers are accessed by an upper layer of the memory storage array exclusively.

19. The computing device of claim 17, wherein the machine-readable storage medium further comprising instructions to:
- release the subset of allocated immediate data buffers by (i) transitioning the immediate data buffers from the stack state to the free state and (ii) swapping a first physical address associated with the subset of immediate data buffers storing the received immediate data to a second physical address associated with a second plurality of available buffers, the second plurality of buffers having the same capacity as the pre-allocated buffers and sharing the same virtual address with the pre-allocated buffers; and
- send an acknowledgement to the client device indicating that the I/O command is completed subsequent to releasing the subset of immediate data buffers.

20. The computing device of claim 17, wherein the machine-readable storage medium further comprising instructions to:
- recursively check an atomic primitive to determine whether the subset of immediate data buffers in the allocated state is being searched for exclusively;
- in response to the atomic primitive indicating that the pre-allocated buffers are being searched exclusively, search for the pre-allocated buffers for storing the received immediate data; and
- in response to the atomic primitive indicating that the pre-allocated buffers are not being searched exclusively, wait for search for buffers associated with a different queue in multiple queues maintained by the network interface layer to be completed.

* * * * *